United States Patent
Dureau, Jr. et al.

(10) Patent No.: US 9,396,488 B1
(45) Date of Patent: Jul. 19, 2016

(54) MESSAGE SELECTION IN A MARKETING-BASED SYSTEM

(75) Inventors: Donald G. Dureau, Jr., Southlake, TX (US); David L. Perona, Houston, TX (US)

(73) Assignee: Teradata US, Inc., Dayton, OH (US)

( * ) Notice: Subject to any disclaimer, the term of this patent is extended or adjusted under 35 U.S.C. 154(b) by 24 days.

(21) Appl. No.: 13/593,551

(22) Filed: Aug. 24, 2012

Related U.S. Application Data

(60) Provisional application No. 61/527,931, filed on Aug. 26, 2011, provisional application No. 61/563,746, filed on Nov. 25, 2011, provisional application No. 61/582,235, filed on Dec. 30, 2011.

(51) Int. Cl.
*G06Q 30/02* (2012.01)

(52) U.S. Cl.
CPC ........ *G06Q 30/0254* (2013.01); *G06Q 30/0242* (2013.01); *G06Q 30/0251* (2013.01)

(58) Field of Classification Search
None
See application file for complete search history.

(56) References Cited

U.S. PATENT DOCUMENTS

| | | | |
|---|---|---|---|
| 2006/0253309 A1* | 11/2006 | Ramsey et al. | 705/7 |
| 2009/0265220 A1* | 10/2009 | Bayraktar et al. | 705/10 |
| 2011/0213655 A1* | 9/2011 | Henkin et al. | 705/14.49 |
| 2011/0307323 A1* | 12/2011 | Kuhn et al. | 705/14.42 |
| 2012/0123863 A1* | 5/2012 | Kaul et al. | 705/14.52 |

* cited by examiner

*Primary Examiner* — Michael Ezewoko
(74) *Attorney, Agent, or Firm* — Randy L. Campbell, Jr.

(57) ABSTRACT

A message selection system may store message selection information. The processor may receive a request to determine a suggested message to transmit to a user interface. In one example, the suggested message may be selected to prompt a predetermined user-based response to be received through the user interface. Based on the received request, the processor may select a plurality of candidate messages from a plurality of messages included in the message selection information. The processor may select a numerical score associated with each of the candidate messages. Based on the numerical scores, the processor may select the suggested message from the plurality of candidate messages. A method and computer-readable medium may also be implemented.

19 Claims, 6 Drawing Sheets

MESSAGE SELECTION IN A MARKETING-BASED SYSTEM

CLAIM OF PRIORITY

This application claims the benefit of priority under 35 U.S.C. §119(e) of U.S. Provisional Patent Application Ser. No. 61/527,931 filed on Aug. 26, 2011, U.S. Provisional Patent Application Ser. No. 61/563,746 filed on Nov. 25, 2011, and U.S. Provisional Patent Application Ser. No. 61/582,235 filed on Dec. 30, 2011, each of which is hereby incorporated by reference herein in its respective entirety.

BACKGROUND

Technology has allowed for efforts in enhancements and improvements of an entity, such as a business, to increase in complexity due to software applications allowing statistical analysis. However, many of these efforts are directed towards a particular targeted interest of the entity, such as revenue, and exist solely for the benefit of marketing activities. In many cases these efforts may indeed improve performance of these targeted interests, but in doing so, may cause other interests (including both marketing and other stakeholders of the entity) to suffer. For example, in an attempt to balance the desire of marketing to sell additional products, the time spent with the customer in a call-center channel may be extended, but such a desire may weigh against the interests of call-center objectives that include reduction of call time and an increase in productivity of the call agents. Thus, a system that considers competing interests of an entity when determining appropriate messaging and other customer interaction efforts would be beneficial.

SUMMARY

According to one aspect of the disclosure, a message selection system may include one or more memories and one or more processors in communication with the memory devices. The memory devices may store message selection information. The processor may receive a request to determine a suggested message to transmit to a user interface. In one example, the suggested message may be selected to prompt a predetermined user-based response to be received through the user interface.

Based on the received request, the processor may select a plurality of candidate messages from a plurality of messages included in the message selection information. The processor may select a numerical score associated with each of the candidate messages. Based on the numerical scores, the processor may select the suggested message from the plurality of candidate messages.

According to another aspect of the disclosure, a method may include receiving a request to select a marketing message. In one example, the request may be to select a marketing message that may prompt a desired user-based response received through a user interface. The method may further include identifying a plurality of candidate marketing messages based on the request. The method may further include determining a plurality of numerical scores. Each numerical score may be associated with one of the candidate marketing messages. The method may further include selecting the marketing message from the plurality of candidate marketing messages based on the numerical scores.

According to another aspect of the disclosure, a computer-readable medium may be encoded with computer-executable instructions executable with a processor. The computer-readable medium may include instructions to receive a request to select one or more marketing messages. The marketing messages may be used to prompt a predetermined user-based response from a user-interface. The computer-readable medium may further include instructions to select a plurality of candidate marketing messages based on the request. The computer-readable medium may further include instructions to generate a plurality of values, wherein each value is associated with one of the candidate marketing messages. The computer-readable medium may further include instructions to select the marketing messages from the plurality of candidate marketing messages based on the values.

The various aspects of the disclosure may be implemented as a system, method, or instructions stored on computer-readable media or may be implemented as a combination thereof.

BRIEF DESCRIPTION OF THE DRAWINGS

The system and method may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE FIGURES

Figure 1:
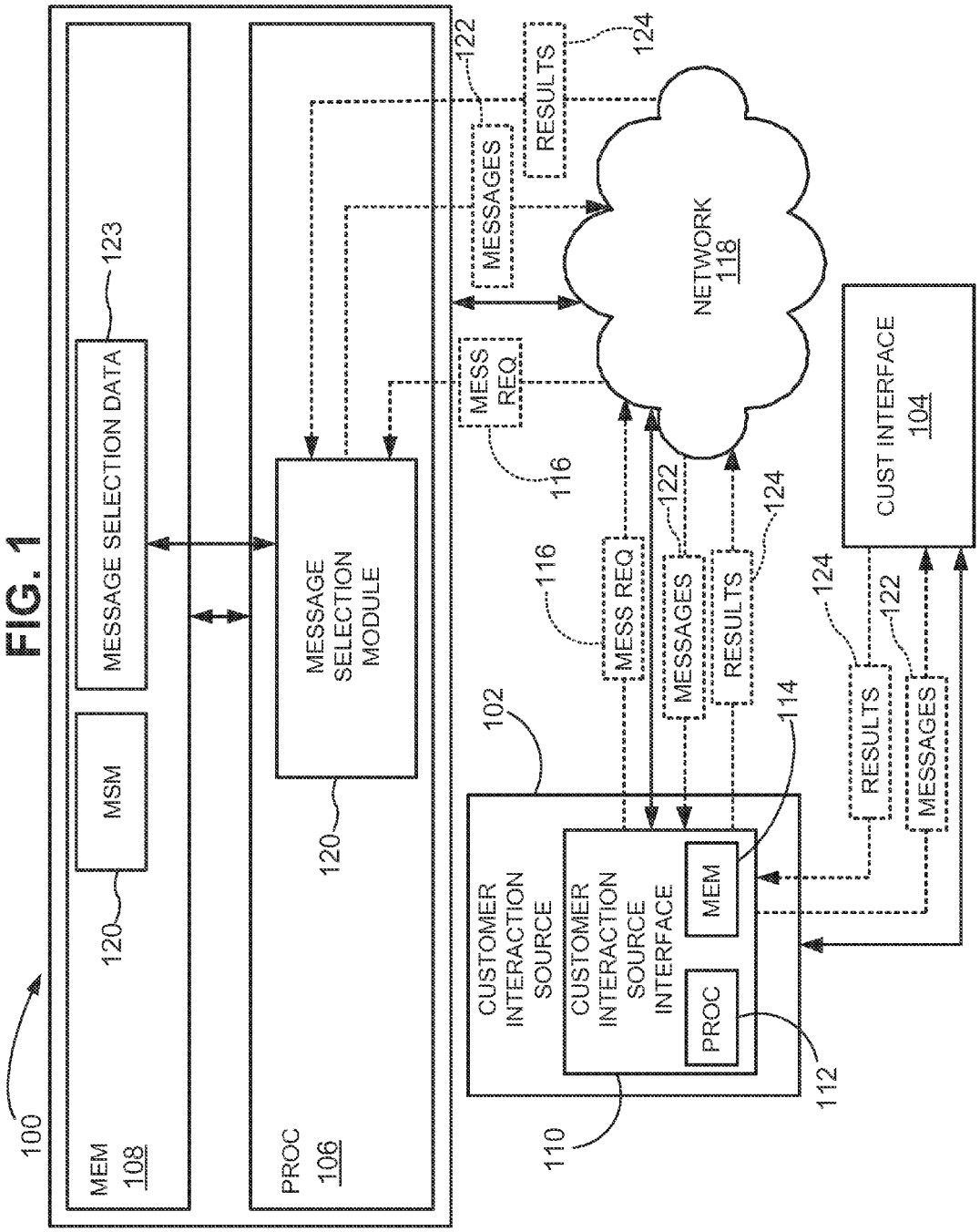
FIG. 1 is a block diagram of an example message selection system.

In one example, a message selection system 100 may select messages for use by a customer interaction source 102. In one example, the message selection system 100 may include one or more processors 106 and one or more memories 108 in communication with the processors 106. The customer interaction source 102 may represent any entity capable of performing customer interaction activities, such as marketing activities, for example. The customer interaction source 102 may use the selected messages to send to a customer via a customer interface 104. The customer interface 104 may represent any device allowing communication between a customer and the customer interaction source 102, such as a computer, smartphone, tablet, telephone, or any other suitable device. The customer interface 104 may interact over one or more media such as a website via a computer, email, telephone, or any other suitable medium.

The customer interaction source 102 may include a customer interaction source interface 110 used to interact with a customer through the customer interface 104. The customer interaction source interface 110 may be a computer system including one or more processors 112 and memories 114. In some examples, the customer interaction source interface 110 and the customer interface 104 may be an integrated unit, such as a kiosk, for example. During interaction with a customer via the customer interface 104, the customer interaction source 102 may communicate with the message selection system 100 using the customer interaction source interface 110. Based on a profile of a customer using the customer interface 104, as well as additional information, the customer interaction source interface 110 may generate a message request 116 and transmit it to the message selection system 100 via the network 118. The network 118 may be wired, wireless, or some combination thereof. Additionally, the network 118 may be a direct network, Internet-connected, virtual private network, and/or other suitable network. In one example, the network 118 may provide a "cloud-based" configuration. In such a configuration the processor 106 may be an array of processors 106 and the memory 108 may be an array of memories 108. The array of memories 108 may store the same data or may store portions of a distributed set of data. The array of memories 108 may store overlapping data such that some, but not all, of the memories 108 store the same data. The processors 106 may communicate with one another and with each of the memories 108 of the array directly and/or via the network 118 allowing each processor 106 to access any of the data stored on any of the memories 108 of the array. In such a cloud-based configuration, the distributed array of processors 106 and array of memories 108 may appear as a single processor 106 and memory 108 to a network interface such as the customer interaction source interface 110.

The message selection system 100 may receive the message request 116 from the customer interaction source interface 110. The message selection system 100 may implement a message selection module (MSM) 120 stored on the memory 108 and executable by the processor 106. As described herein, "modules" are defined to include software, hardware or some combination thereof executable by one or more physical and/or virtual processors.

Software modules may include instructions stored in the one or more memories that are executable by one or more processors. Hardware modules may include various devices, components, circuits, gates, circuit boards, and the like that are executable, directed, and/or controlled for performance by one or more processors.

The message selection module 120 may be implemented to select messages specifically targeted to elicit a particular level of response from a customer via the customer interface 104. Upon selection of messages 122, the message selection module 120 may transmit the selected messages 122 to the customer interaction source interface 110 allowing the customer interaction source 102 to present some or all of the selected messages 122 via the customer interface 104. The customer interaction source interface 102 may obtain results 124 indicative of the response of the customer via the customer interface 114. The results 124 may be transmitted to the message selection system 100 allowing the message selection system 100 to use the results 124 for learning purposes in order to enhance the accuracy of subsequent message selection.

In one example, the message selection module 120 may implement message selection data 123, which may include information stored as an array of data structures in the memory 108, in order to perform the message selection. In one example, the selected messages 122 may be selected by the message selection module 120 through a scoring-based system. Messages deemed appropriate for potential use with a particular customer via a particular customer interface 104 (phone, website, etc.) may be scored and those scores maybe used to generate other scores based on previously-established relationships, with the other scores referred to as arbitrations. Each arbitration may be expressed as a mathematical function representative of a particular message, as well as other factors.

In the message selection system 100, each message may be associated with one or more business objectives. A business objective may refer to specific areas and/or categories of interest of the customer interaction source 102. For example, business objectives may include customer retention, revenue generation, customer satisfaction, call-handling time reduction, agent quota achievement, etc. Each message may impact an associated business objective in a different manner, which may result in the same message having different arbitrations with respect to different business objectives.

Figure 2:
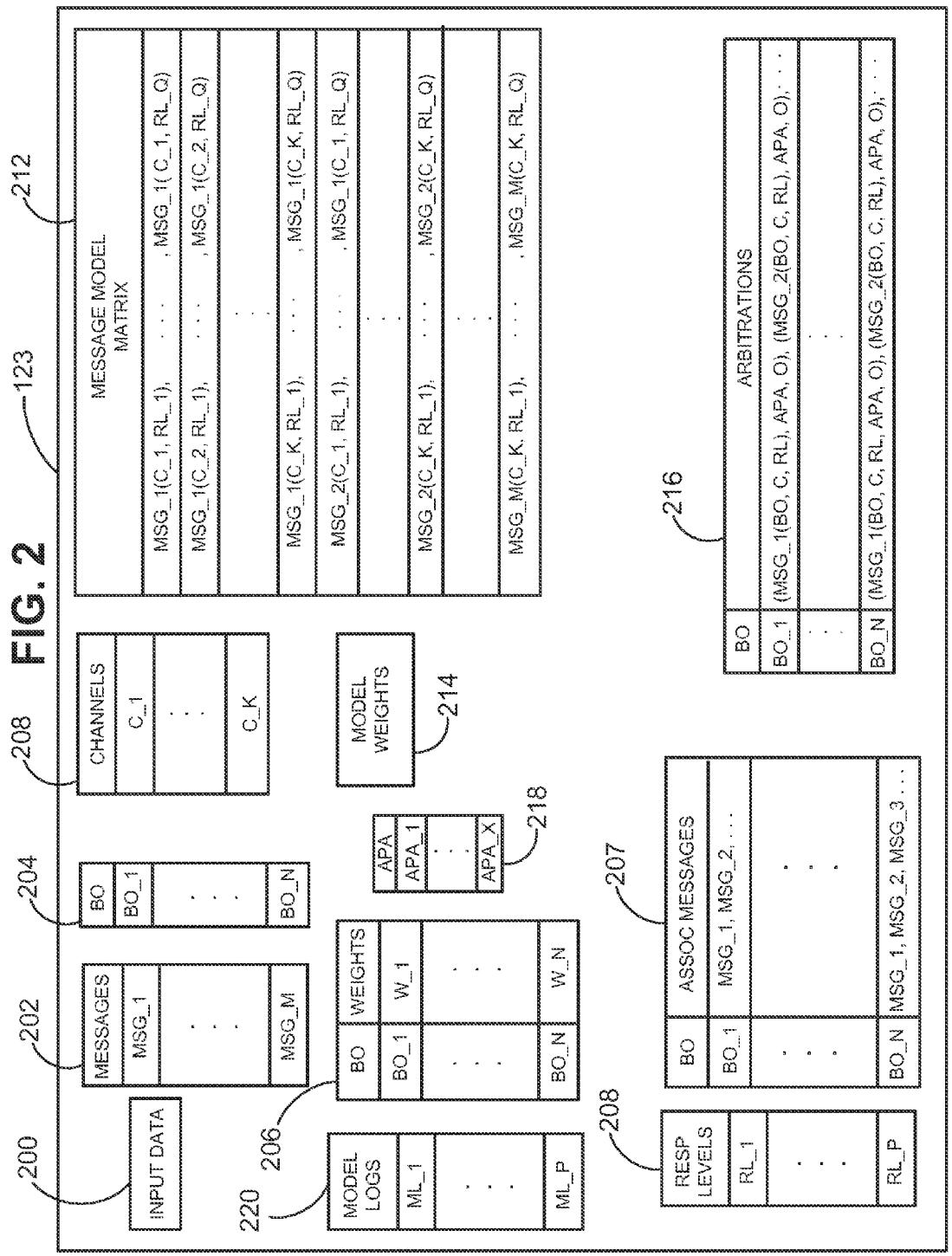
FIG. 2 is a block diagram of example data structures implemented by the message selection system of FIG. 1.

The message selection module 120 may implement these relationships included in the message selection data 123 in order to generate a particular score. FIG. 2 is an example of various data structures that may be included as the message selection data 123, such as data tables, that may be used by the message selection module 120 in order to perform message selection. Input data 200 may include various types of data used by the message selection module 120, such as previously-obtained customer information including customer profiles, as well as, customer contact history, current customer interaction context, social network data, message level attributes, etc.

Messages 202 may be maintained in the memory 108. The messages 202 may be predetermined prior to operation of the messages selection system 100, but may be updated, changed, or otherwise manipulated before, during, and after activation of the message selection system 100 in order to add messages, remove existing messages, or to change existing messages, for example. In the example of FIG. 2, there are a number M messages for potential selection.

Business objectives (BO) 204 may also be maintained in the memory 108. In FIG. 2, there are a number N business objectives 204. The memory 108 may also include a business objective weight table 206. The business objective weights (W) may represent the relative importance of the of business objectives as deemed by the customer interaction source 102. This relative importance may be represented as a corresponding numerical weight $W\_1$ through $W\_N$. In one example, each weight may be less than one with all weights summing to one, such that each weight represents a percentage indicating relative importance. Each message 202 may also be associated with one or all of the business objectives 204. The associations are maintained in the memory 108 in a business objective—message association table 207, which identifies the associations between each message 202 and business objective 204.

The memory 108 may also store a message response level (RL) table 208. Each response level RL may represent some discrete level of response of a message. For example, a particular message may represent an offer of a particular service available by the customer interaction source 110. The particular message may have a response level of "accepted" in which indicates that a customer has accepted the offer of the services. The particular message may also have a response level of "interested" in which the customer has provided some indication of interest in the offer, but has neither accepted nor rejected the offer. In FIG. 2, as an example, there are a number Q different response levels ($RL\_1$ through $RL\_Q$).

A channel table 210 may also be maintained in the memory 108. In FIG. 2, the channel table 210 includes a number K of channels $C\_1$ through $C\_K$. Each channel C may represent an available mode for customer communication, such as a website, email, phone, etc. The channel table 210 may be used when determining which messages 202 are appropriate for a customer interaction. For example, some messages 202 may only be appropriate if delivered by telephone, thus if a customer is interacting with a customer interaction source 102 via a website, the telephone-based message 202 would be inappropriate for consideration.

Each message 202 may have one or more associated numerical scores used in the selection of the selected messages 122 by the message selection system 100. The scores may be generated from a respective message model based on a unique combination of each available response level RL and available channel C. Thus, each message 202 may have multiple associated message models depending on the number of channels C and response levels RL. Each message model may be used in an arbitration for each associated business objective.

Figure 3:
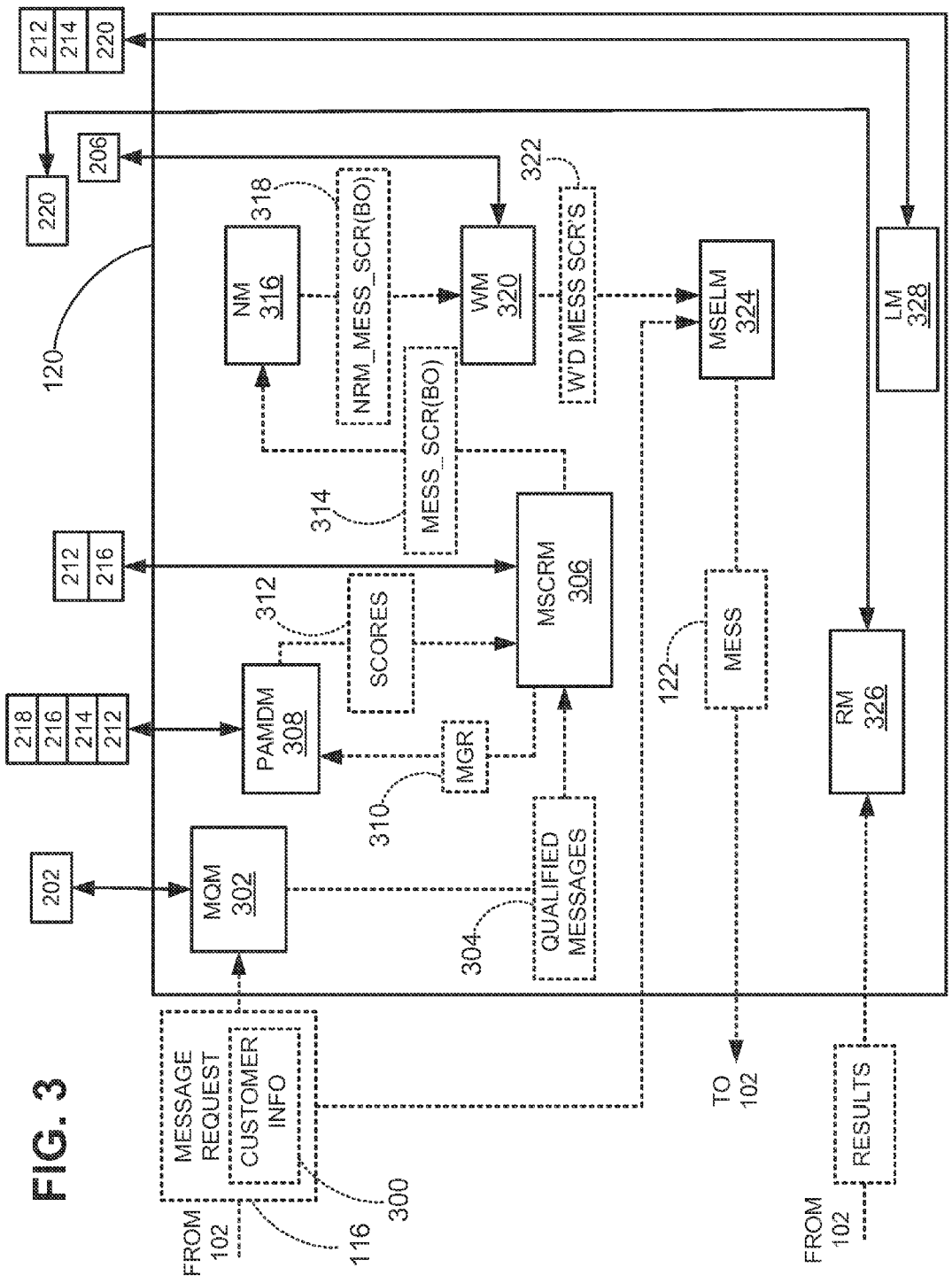
FIG. 3 is a block diagram of an example message selection module of the message selection system of FIG. 1.

Each message model may be produced by a model generator (see FIG. 3). Each message function may include both input data 200 and predictive analytics. The predictive analytics may be model-based predictive determinations that provide a numerical output as a quantitative measure of a prediction, such as the likelihood of an event occurrence. Predicative analytics may be used to model an impact of a message 202 or some other aspect on a business objective 204. Predictive analytic models allow the generation of a quantitative indicator of this aspect, which may be used to determine the overall impact of a particular message 202, along with other aspects, on a particular business objective 204 with respect to the particular message 202 being presented to a customer for some targeted level of response.

In FIG. 2, a message model matrix table 212 indicates the potential message models that may be generated over the course of operation of the message selection system 100. The message model matrix table 212 may represent data maintained to produce each message model. For example, the expression "MSG 1($C\_1$, $RL\_1$)" represents the message model for message $MSG\_1$ based on customer interaction via channel $C\_1$ with a targeted response level $RL\_1$. In one example, each message model may be a statistical algorithm used to calculate a score for each level of response and channel.

Each message model represented in the message matrix model table 212 may use information from a model weights table 214. The model weights table 214 may provide relationships between interaction information received from the customer interaction source interface 110 and corresponding values used to generate numerical scores from the models. For example, a customer age may be provided to the message selection module 120 in the message request 116 when selecting the selected messages 122. However, instead of using the actual customer age value, a corresponding weight value from the model weights table 214 is used as input to a model to represent the customer age or some range in which the customer age falls.

An arbitration table 216 stored in the memory 108 includes, for each business objective 204, an arbitration (ARB) for each associated message 202 as indicated in the table 207. Each arbitration (ARB) may represent a mathematical function that produces an arbitration score for each message with respect to each business objective 204. Each arbitration may be a function of the message model for the associated message, additional predictive analytics (APA) in table 218, and other numerical values (O), such as constants, which may be stored with input data 200. The additional predictive analytics 218 represent predictive analytics that do not target a particular targeted message response level or channel and instead target a variable in a customer interaction system associated with the customer interaction source 102 that may represent a desired state, metric, or constraint that can be measured by the customer interaction system with the goal to determine the impact of a particular message 202 and a particular customer profile on the target variable. These predictive analytics APA are agnostic with respect to the business objectives 204.

For each business objective 204, only one arbitration per associated message is used. The particular message model used will depend on the channel C and target response level RL. The arbitration table 216 indicates the relationships between the business objectives 204, the message models, additional predetermined analytics APA, and the other variables. For example, an arbitration for business objective $BO\_1$ represented by the expression "(MSG_1($BO\_1$, $RL\_1$, $CH\_1$), APA, O)" represents the arbitration for message 1 with respect to business objective $BO\_1$ as a function of channel $CH\_1$ and response level $RL\_1$.

Model logs (ML) may be stored in model log table 220 maintained the memory 108. In FIG. 2, the model logs are individually designated as $ML\_1$ through $ML\_P$, where P is the number of model logs ML. The model logs ML represent information used to update the message models, such as those referenced in the message model matrix table 212, as well as models represented by the additional predictive analytics APA. The model logs ML may be transient in nature in that once the models are updated, the information used for updated may no longer be stored.

FIG. 3 is block diagram of an example of the message selection module 120 during message selection. In one example, the message selection module 100 may receive the message request 116, which may contain customer information 300 related to customer currently interacting with the customer interface 104, such as the customer profile, targeted response level, current channel, etc. The message request 116 may be received by a message qualification module (MQM) 302. The MQM 302 may select the messages 202 from the memory 108 based on the customer profile, channel, etc., that form the pool of messages for potential selection when determining the selected messages 122. For example, if the customer interface 104 is a telephone, messages that are web-based would be disqualified from consideration in determining the selected messages 122.

Upon selection of qualified messages 304, the qualified messages 304 are provided to a message scoring module (MSCRM) 306. The MSCRM 306 may be responsible for generating a score (arbitration) for each qualified message 304 for each business objective 204. In one example, the MSCRM 306 may generate a score associated with each qualified message 304 using the message model matrix table 212 and the arbitration table 216. The MSCRM 306 may use the tables to determine the appropriate models from the message model matrix table 212. Upon selection of the appropriate models, the MSCRM 306 may generate a model generate request (MGR) 310 that is transmitted to a predictive analytics model determination module (PAMDM) 308. The PAMDM 308 may generate the appropriate models 312 based on the MGR 310 and provide them to the MSCRM 306. The PAMDM 308 may generate the models based on the relationships in the message model matrix table 212 and the additional predictive analytics table 218. The models generated by the PAMDM 308 may be based in various statistical analyses to produce a quantitative metric indicative of an impact of particular aspect of a message 202 or the impact of the entire message 202 on an associated business metric, constraint or state. In one example, the PAMDM 308 may use one or both of Bayesian analysis and linear regression in determining a predictive analytic, or may use another suitable mode of analysis.

The models may be transmitted to the MSCRM 306. The MSCRM 306 may generate the numerical scores using the message models, model weights from the table 214, other variables if applicable, and the arbitrations in the arbitration table 216. The MSCRM 306 may use the relationships contained in the arbitration table 216 to determine the arbitration scores.

The MSCRM 306 may generate an arbitration score for each qualified message 304 with respect to each associated business objective. These message scores (MESS_SCR(BO)) 314 are processed by a normalization module (NM) 316. The normalization module 316 is used to put the range of message scores 314 associated with each business objective 204 which potentially used a different arbitration formula into a similar range of values so the scores can be compared between business objectives. The normalization of the message scores 314 may determine their relative distance from the mean value over a common range of values. The normalization module 316 generates the normalized message scores (NRM_MESS_SCR(BO)) 318. The normalized messages scores 318 may then be weighted using the business objective weights contained in the table 206. A weighting module (WM) 320 may retrieve the table 206 and multiply each of the normalized message scores 318 by the corresponding weighting factor. For example, message MS_1 may have normalized message scores 318 for business objectives BO_1 and BO_2. Using the weighting module 320, each normalized message score 318 is multiplied by the weighting factor associated with the corresponding business objective 204. This procedure allows the weighting module 320 to generate the weighted message scores (W'D MESS_SCR'S) 322. A message selector module (MSELM) 324 may select one or more messages included in the qualified messages 304 based on the message request 116. For example, the message request 116 may request the top five messages based on the magnitude of the weighted message scores. In response, the message selector module 324 would select the top five messages based on the magnitudes of the weighted message scores 322, if five messages existed, and transmit the five messages to the customer interaction source interface 110.

The customer interaction source interface 110 may provide the results 124 of the interaction of the customer via the customer interface 104 to a results module (RM) 326. The results module 326 may determine if the results 124 are different from those included in the model log table 220. If the results are different, the results module 326 may write the new information into the model log table 220.

A learning module 328 may periodically check the model log table 220 to determine if the models represented in tables 212 and 220 are to be updated. In one example, this determination may be based on a predetermined condition such as a predetermined threshold. If the model log table 220 contains enough new information that exceeds a predetermined amount of data, the learning module 328 may update the appropriate models for subsequent generation by the PAMDM 308. In one example, the determination to update the models based on the amount of new information in the model log table 220 may be a on a model-to-model basis. Thus, the predetermined thresholds may also be on a model-to-model basis, such that the learning module 328 may determine that the amount of new information in the model log table 220 is greater than a predetermined threshold associated with a particular model and subsequently update the particular model. The learning module 328 may also update the model weights table 214 using predetermined threshold comparisons. In alternative examples, the amount of new information may be compared to a predetermined global threshold allowing a batch update of various models.

Figure 4A:
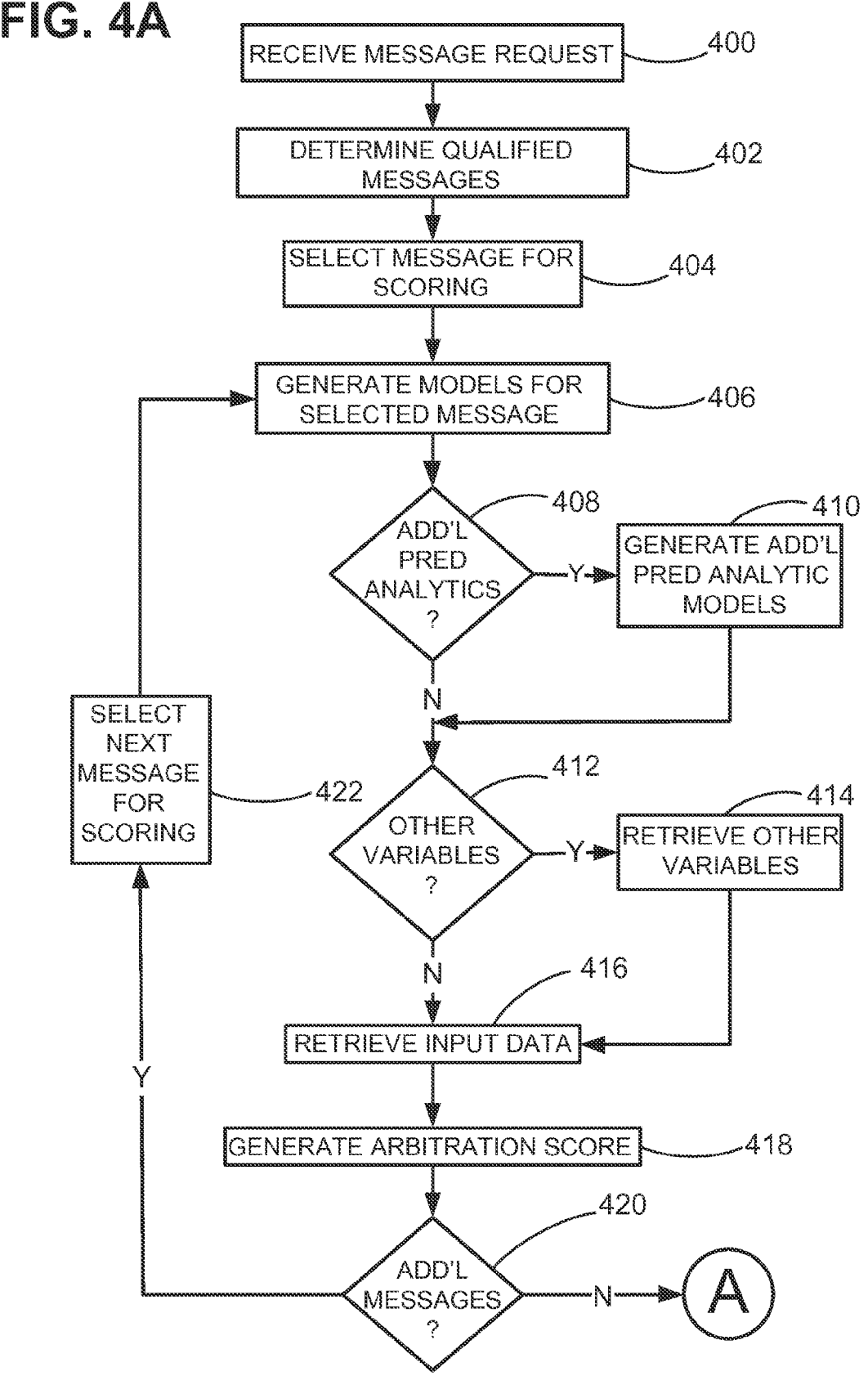
FIGS. 4A and 4B are an example operational flow diagram of the message selection system of FIG. 1.
Figure 4B:
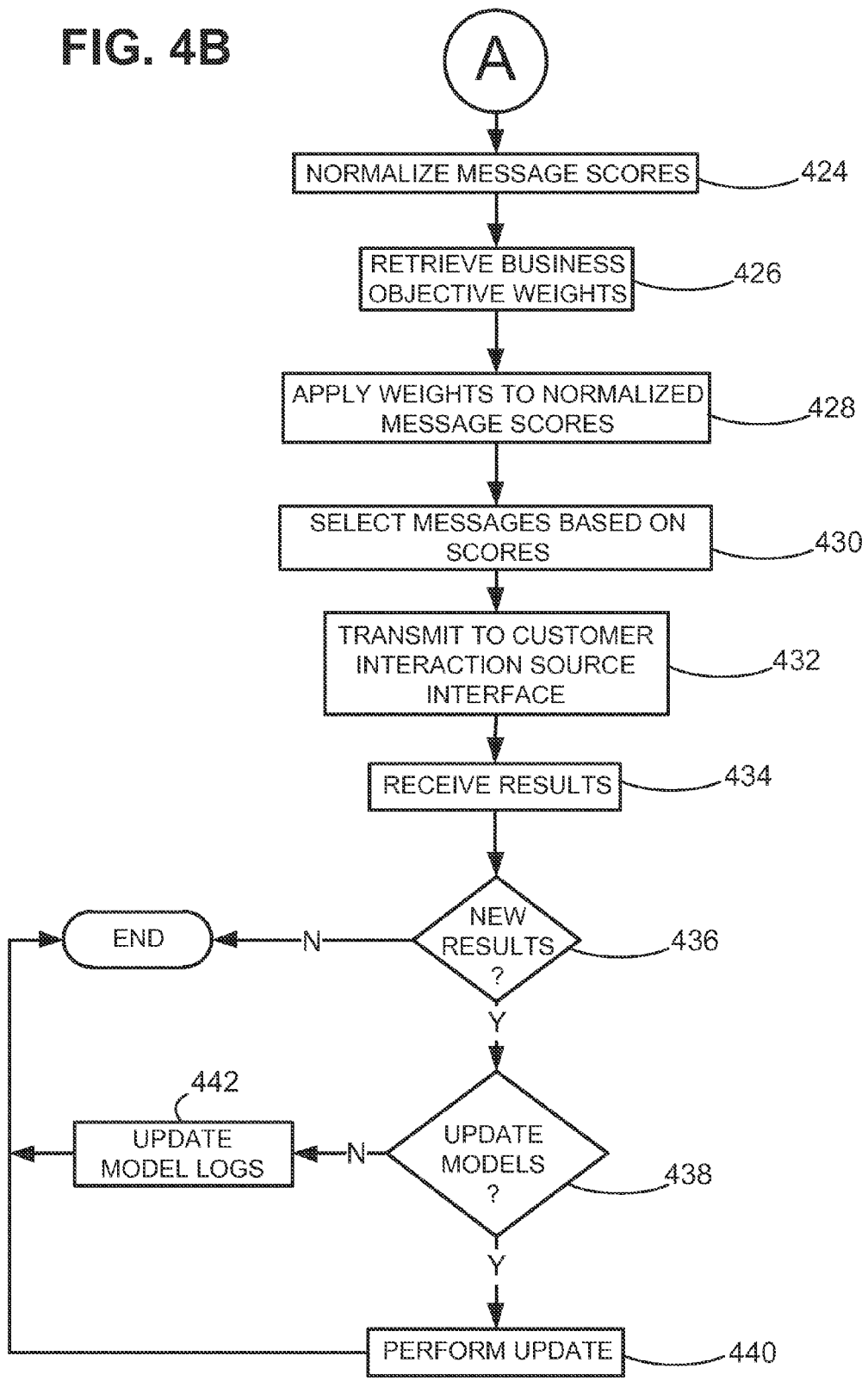

FIGS. 4A and 4B are an example operational flow diagram of the message selection system 100. In one example, message selection system 100 may receive a message request 116 (400). The message selection module 120 of the message selection system 100 may receive the message request 116 and, based on information in the message request 116, such as channel C and response level RL, and the included customer information 300, determine which of the messages 202 may be considered as qualified messages 304 used to respond to the message request 116 (402). The message selection module 120 may select one of the qualified messages 304 for scoring (404). Upon selection of a message from the qualified messages 304 to be scored, the message selection module 120 may generate message models for the selected message (406), such as through the message model matrix table 212, for example.

The message selection module 120 may determine if any additional predictive analytics (408) are associated with the selected message, such as those used for calculating the arbitration scores. If additional predictive analytics exist associated with scoring the current message 202, the models associated with the predictive analytics may be generated (410). Once the additional predictive analytic models have been retrieved, or if no additional predictive analytic models exist, the message selection system 100 may determine if other variables exist related to calculating scores associated with the current message being scored (412). If other variables exist, the other variables may be retrieved (414). If no other variables exist or once they have been retrieved, input data for arbitration score calculation may be retrieved (416).

Once the models, other variables, and input data are obtained, the message selection module 120 may generate the arbitration scores associated with each business objective (418). The message selection module 120 may determine if additional messages in the qualified messages (420) require scoring. If other qualified messages 304 exist, the next message from the qualified messages 304 may be selected (422) and generation of arbitration scores may be performed.

Once the arbitration scores are determined, the message selection module 122 may normalize the message scores 314 across the business objectives 204 relevant to the particular message scores 314 to generate the normalized message scores 318 (424). The message selection module 122 may retrieve the business objective weights from the table 206 (426) and multiply the corresponding normalized message scores 318 by the business objective weights (428). These weighted scores 322 may be used to select the specific messages meeting the message request 116 (430). These selected messages may be transmitted to the customer interaction source interface 110 (432). The message selection module 120 may receive the results 124 indicating the response level provided by the customer receiving the selected messages 122 (434).

Upon receipt of the results, the message selection module 120 may determine if any of the results 124 are new with respect to previous results obtained (436). If no new results exist, the message selection module 120 may end activity. If the results are new, the message selection module 120 may determine if enough new results for one or more models exist in order to update corresponding message models, additional predetermined analytics, and/or model weights used to generate predictive analytic models (438). This determination of the amount of new results may be based on the new results contained in the results 124, as well as any previously-stored results that have not yet been used to update any predictive analytic models. If the amount of new results is above a predetermined threshold, the appropriate models and/or model weights may be updated for generation of updated predictive analytic models (440). If the results are new, but do not meet the predetermined threshold alone or with any other combined new results, the new results may be stored in the model logs ML of the model log table 220 for subsequent use in updated any models (442).

Figure 5:
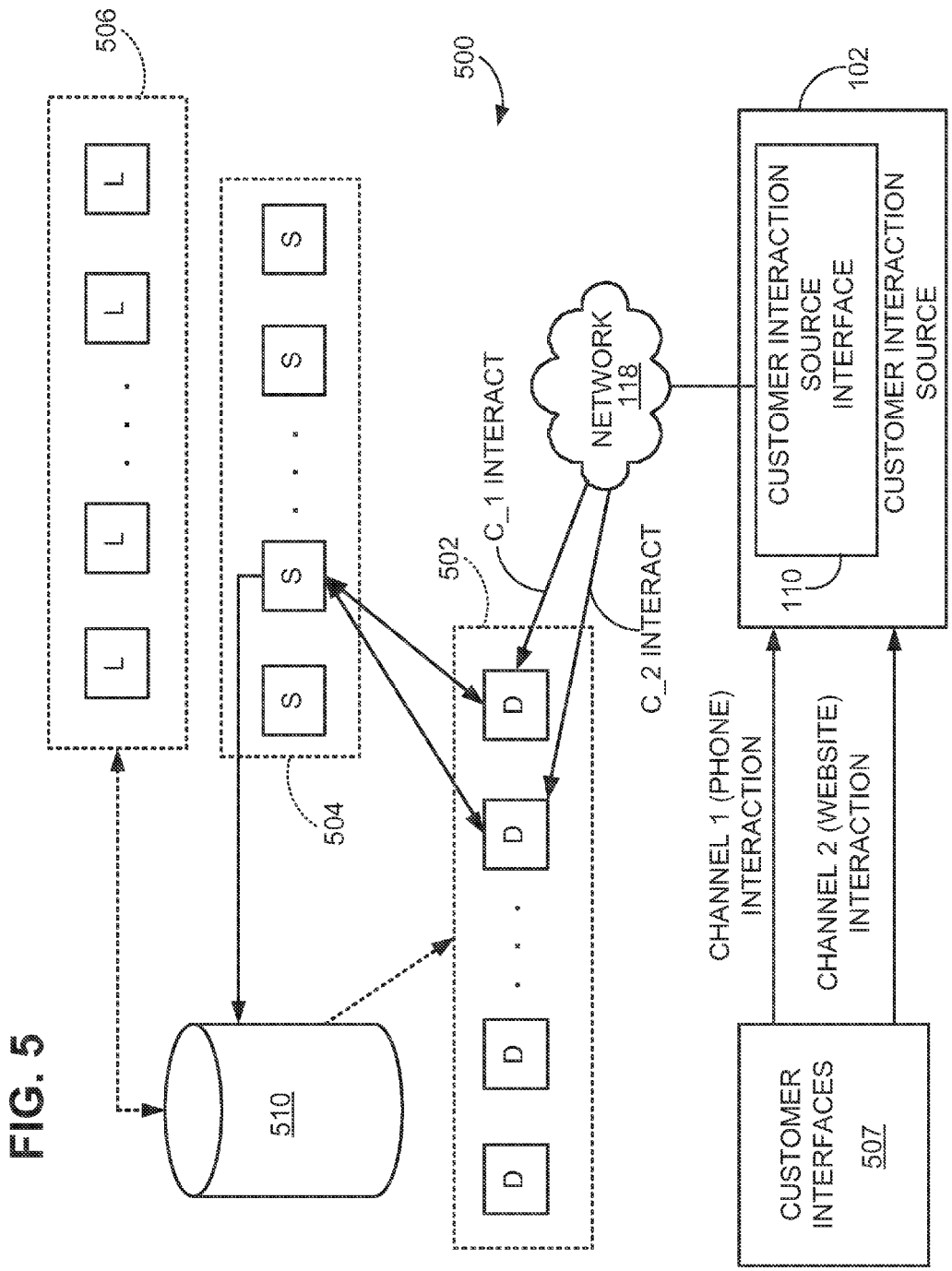
FIG. 5 is a block diagram of another example message selection system.

FIG. 5 is a block diagram of another example of a message selection system 500. The message selection system 500 may include an array of decision servers (D) 502, an array of session servers (S) 504, and an array of learning servers (L). Each server may include at least one processor and associated memory. In one example, a customer may interact with the customer interaction source 102 via various customer interfaces 507. In FIG. 2, a customer may interact with the customer interaction source 102 via a first channel (telephone) of the customer interfaces 507. This interaction may result in the customer interaction source interface 110 initiating the message selection system 500. A decision server D may receive information related to the customer from the channel 1 interaction. The decision server D may determine what information is sent to the customer interaction source interface 110 for subsequent customer interactions. The decision server D dealing with the channel 1 interaction may communicate with a session server S, which establishes the particular session with a customer via the customer interaction source interface 110.

However, in FIG. 5, before any messages are selected for the customer, the customer may disconnect from channel 1 and reconnect via channel 2, such as visiting a company website associated with the customer interaction source 102. This interaction causes the customer interaction source interface 110 to communicate with a different decision server D. In one example, if the customer interacts through a subsequent channel (channel 2) within a predetermined period of time of interacting through another channel (channel 1), the message selection system 500 may consider this the same session and the decision server D handling the second interaction may communicate with the same session server S. Message selection information, such as the message selection data 123 may be stored in a data store 510. The decision servers 502 handling the customer interactions via the customer interaction source interface 110 may retrieve information from the data store 510. Once the session has ended, the session servers 504 may transmit session information to the data store 510 for purposes of updating the model logs ML and associated data. The learning servers 506 may routinely analyze the amount of new data in the model logs ML stored in the data store 510 to determine if the models should be updated based on the amount of new data in the model logs ML.

The term "memory" or "memories" used herein may include one or more memories and may be computer-readable storage media or memories, such as a cache, buffer, RAM, removable media, hard drive, flash drive or other computer-readable storage media. Computer-readable storage media may include various types of volatile and nonvolatile storage media. Processors described herein may implement various processing techniques such as multiprocessing, multitasking, parallel processing and the like, for example.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A message selection system comprising:
a memory device configured to store message selection information, wherein the message selection information comprises a plurality of suggested messages, wherein each of the plurality of suggested messages is associated with one of a plurality of electronic channels of communication; and
a processor in communication with the memory device, the processor configured to:
receive a request from a marketing source during an active session between the marketing source and a user interface to determine a suggested message to transmit from the marketing source to the user interface over an electronic channel of communication from the plurality of electronic channels of communication during the active session between the marketing source and the user interface, wherein the request is based on input received from the user interface by the marketing source during the active session, and wherein the user interface is a marketing target, wherein the suggested message is configured to elicit a desired response from the marketing target during the active session;
select, based on the request, a plurality of candidate messages for the electronic channel of communication from a plurality of messages included in the message selection information during the active session;
during the active session, for each candidate message, generate a respective corresponding numerical score for each of a plurality of business objectives, wherein each numerical score is based on relationship unique to each business objective that includes factors associated with specific levels of response to an associated candidate message and an associated electronic channel of communication;
select, based on the numerical scores, the suggested message from the plurality of candidate messages during the active session; and
transmit the suggested message to the marketing source, wherein the suggested message is configured to be transmitted from the marketing source to the user interface during the active session.

2. The message selection system of claim 1, wherein each numerical score is based on a respective statistical model, wherein each respective statistical model is associated with at least one of the electronic channels of communication and a desired level of user-based response received through the marketing source.

3. The message selection system of claim 2, wherein each respective statistical model is based on one of a Bayesian model and linear regression.

4. The message selection system of claim 2, wherein the message selection information includes the plurality of business objectives, wherein each respective statistical model is associated with one or more the plurality of business objectives, and wherein each candidate message is associated with one or more of the business objectives.

5. The message selection of claim 4, wherein the message information includes each of the relationship, wherein each relationship is associated with a respective one of the predetermined business objectives and a respective one of the statistical models, and wherein the processor is further configured to evaluate the expression each relationship to produce a plurality of initial numerical scores.

6. The message selection of claim 5, wherein the processor is further configured to adjust, during the active session, each initial numerical score by a predetermined weighting factor associated with the respective predetermined business objective, wherein each adjusted initial numerical score is one of the numerical scores.

7. The message selection system of claim 1, wherein the processor is configured to select, during the active session, the candidate message having the highest associated numerical score as the suggested message.

8. A method comprising:
   storing a plurality of marketing messages in a storage device, wherein each of the plurality of marketing messages is configured to be transmitted over a respective one of a plurality of electronic channels of communication;
   receiving, with a processor, a request from a marketing source during an active session with between the marketing source and a marketing target device to select a marketing message from the plurality of marketing messages for a respective electronic channel of communication from the plurality of electronic channels of communication during the active session with between the marketing source and the marketing target device, wherein the request is based on input received from the marketing target device, and wherein the marketing message is configured to elicit a desired response from the marketing target device;
   identifying, with the processor, a plurality of candidate marketing messages from the plurality of marketing messages stored in the storage device based on the request during the active session;
   during the active session, for each candidate message, generating, with the processor, a respective corresponding numerical score for each of a plurality of business objectives, wherein each numerical score is based on relationship unique to each business objective that includes factors associated with specific levels of response to an associated candidate message and an associated electronic channel of communication;
   selecting, with the processor, the marketing message from the plurality of candidate marketing messages based on the numerical scores during the active session; and
   transmit the marketing message to the marketing source, wherein the suggested message is configured to be transmitted from the marketing source to the marketing target device during the active session.

9. The method of claim 8, further comprising determining, with the processor, the electronic channel of communication over which the marketing message is to be transmitted to the marketing target device during the active session, wherein identifying, with the processor, the plurality of candidate marketing messages comprises identifying, with the processor, the plurality of candidate marketing messages based on the determined electronic channel of communication during the active session.

10. The method of claim 8, wherein each of the plurality of candidate marketing messages is associated with at least one of the plurality of business objectives, wherein determining, with the processor, the plurality of numerical scores comprises:
   determining, with the processor, a preliminary numerical score for each association between a candidate message and one of the business objectives during the active session; and
   determining, with the processor, the plurality of numerical scores based on the preliminary numerical scores during the active session.

11. The method of claim 10, wherein determining the plurality of numerical scores further comprises applying, with the processor, one of a plurality of predetermined weighting factors to each of the preliminary numerical scores to produce the numerical scores during the active session, wherein each of the predetermined weighting factors is associated with a respective one of the business objectives, wherein each predetermined weighting factor is applied to a preliminary numerical score having the same associated business objective.

12. The method of claim 11, wherein selecting, with the processor, the marketing message comprises selecting, with the processor, the marketing message associated with a highest numerical score during the active session.

13. The method of claim 11 further comprising receiving results from the marketing source, wherein the results are indicative of at least one user-based response from the marketing target device based on the selected marketing message.

14. A non-transitory computer-readable medium encoded with a plurality of instructions executable by a processor, wherein the plurality of instructions comprises:
   instructions to store a plurality of marketing messages in a storage device, wherein each of the plurality of marketing messages is configured to be transmitted over a respective one of a plurality of electronic channels of communication;
   instructions to receive a request from a marketing source during an active session between the marketing source and a user interface to select at least one marketing message from the plurality of marketing messages for a respective electronic channel of communication from the plurality of electronic channels of communication, wherein the at least one marketing message is configured to prompt a predetermined user-based response from a user interface to the marketing source during the active session with the user interface, wherein the request is based on input received from the user interface by the marketing source, and wherein the user interface is a marketing target;
   instructions to select a plurality of candidate marketing messages from the plurality of marketing messages based on the request during the active session;
   during the active session, for each candidate marketing message, instructions to generate a respective corresponding value for each of a plurality of business objectives, wherein each value is based on relationship unique to each business objective that includes factors associated with specific levels of response to an associated candidate marketing message and an associated electronic channel of communication;
   instructions to select the at least one marketing message from the plurality of candidate marketing messages based on the values during the active session; and
   instructions to transmit the at least one marketing message to the user interface wherein the at least one marketing message is configured to be transmitted from the marketing source to the user interface during the active session.

15. The non-transitory computer-readable medium of claim 14, wherein the instructions to select the plurality of candidate marketing messages comprise:
   instructions to identify the electronic channel of communication used by the user interface based on the request during the active session; and
   instructions to select the plurality of candidate marketing messages based on at least one of the electronic channel of communication and the predetermined user-based response during the active session.

16. The non-transitory computer-readable medium of claim 14, wherein the instructions to generate the plurality of values comprise:
instructions to generate a preliminary value for each of the candidate messages with respect to each association with a respective business objective, wherein each preliminary value is indicative of a relative impact of the predetermined user-based response to a respective candidate message on the associated business objective during the active session; and
instructions to generate the plurality of values based on the preliminary values during the active session.

17. The non-transitory computer-readable medium of claim 16, wherein the instructions to generate a preliminary value comprise:
instructions to select a predictive statistical model for each candidate message during the active session; and
instructions to generate each predictive statistical model, wherein each generated predictive statistical model produces one of the preliminary values during the active session.

18. The non-transitory computer-readable medium of claim 16, wherein the instructions to generate the plurality of values based on the preliminary values comprise:
instructions to select a plurality of predetermined weighting factors during the active session, wherein each predetermined weighting factor is associated with one of a respective one of the business objectives, wherein a magnitude of each predetermined weighting factors is indicative of a relative importance of a business objective with respect to other business objectives; and
instructions to apply each predetermined weighting factor to a respective preliminary value that has a common associated business objective to produce each of the plurality of values during the active session.

19. The non-transitory computer-readable medium of claim 14, wherein instructions to select the at least one marketing message from the plurality of candidate marketing messages based on the values comprise instructions to select a predetermined number of marketing messages from the plurality of candidate marketing messages during the active session, wherein the selected predetermined number of marketing messages have the highest associated values with respect to other candidate marketing messages.

* * * * *